United States Patent [19]

Ohata et al.

[11] Patent Number: 5,828,932
[45] Date of Patent: Oct. 27, 1998

[54] DOCUMENT READING APPARATUS AND DOCUMENT READING METHOD

[75] Inventors: Mitsuharu Ohata; Keiko Uto; Hideki Sugiura, all of Ebina, Japan

[73] Assignee: Fuji Xerox Co., Ltd., Tokyo, Japan

[21] Appl. No.: 819,266

[22] Filed: Mar. 18, 1997

[30] Foreign Application Priority Data

Mar. 19, 1996 [JP] Japan ................................. 8-063207

[51] Int. Cl.⁶ .................................................. G03G 15/00
[52] U.S. Cl. ........................... 399/209; 355/75; 358/497; 399/367
[58] Field of Search .......................... 399/45, 365, 367, 399/370, 376, 209; 358/474, 497, 501, 504, 505; 355/75; 271/265.01

[56] References Cited

U.S. PATENT DOCUMENTS

| | | | |
|---|---|---|---|
| 4,803,561 | 2/1989 | Kubota | 358/497 |
| 5,198,859 | 3/1993 | Soma et al. | 355/75 X |
| 5,203,554 | 4/1993 | Suzuki et al. | 271/265.01 X |
| 5,258,812 | 11/1993 | Mahoney | 399/370 |
| 5,596,400 | 1/1997 | Kasamatsu et al. | 399/45 |

FOREIGN PATENT DOCUMENTS

A-1-291272  11/1989  Japan.
8-234512   9/1996  Japan.

*Primary Examiner*—Sandra L. Brase
*Assistant Examiner*—Sophia S. Chen
*Attorney, Agent, or Firm*—Oliff & Berridge PLC

[57] ABSTRACT

Attributes of an original (image density and discrimination between a color image and a black-and-white image) stopped on a platen glass is read by a reading unit in which light is irradiated upward from a lamp and reflection light is finally read by an image sensor. Next, while carriages of the reading unit are moved rightward, an image of the original is read by the reading unit. After completion of the reading operation, the carriages are held at a position near an image reading end position. Then, the readout original is ejected from above the platen glass, and the next original is transported by an automatic document feeder so as to be stopped on the platen glass. Thereafter, while the carriages are moved leftward, attributes of the next original stopped on the platen glass are read.

9 Claims, 9 Drawing Sheets

DOCUMENT READING APPARATUS AND DOCUMENT READING METHOD

BACKGROUND OF THE INVENTION

1. Field of the Invention

The present invention relates to a document reading apparatus and a document reading method for separately reading attributes and an image of an original that is supplied from an automatic document feeder.

2. Description of the Related Art

Conventionally, there are two methods in color copying machines: in one method, a user first sets various attributes of an original by using a user interface and then starts a copying operation; and in the other method, a user starts a copying operation without setting these attributes. Among these conventional color copying methods, the latter method requires the prescanning operation for sensing various attributes of one original before reading an image itself (called a "copy scanning operation"). For instance, as such a prescanning operation, there are the following scanning operations. In an AE (auto exposure) scanning operation, image density of an original is automatically detected, and a light amount of a lamp provided in an optical system is varied to control the detected density to proper density. In an ACS (auto color selection) scanning operation, a judgment is made as to whether an image of an original is printed in color, or black and white. In an original sense scanning operation, a judgment is made as to whether or not an original size corresponds to a regular size, and if the original size is the regular size, then a size of this original is sensed. In general, the AE scanning operation and the ACS scanning operation are carried out at the same time within a single prescanning operation. When both of these scanning operations are carried out at the same time, they are referred to as an "AE/ACS scanning operation."

In a copying machine, a document reading apparatus is equipped with a platen glass, and a reading device for reading an original on the platen glass. The reading device contains a light emitting unit for irradiating light toward the original on the platen glass, a mirror and a lens which guide reflection light from the original, and a light receiving unit such as a CCD for receiving the guided light. Furthermore, a transportable carriage mounted with the light emitting unit and the mirror is provided in the document reading apparatus. While transporting this carriage, the reading device may scan over the substantially entire surface of the platen glass, or the substantially entire surface of the original region.

Conventionally, in general-purpose color copying machines, a carriage is moved from a reading start position (home position) along the same direction so as to commence reading of necessary information even in the prescanning operation and also the copy scanning operation. After one scanning operation is accomplished, the carriage must be necessarily returned from a reading end position (scanning end position) to a home position in order to perform the next scanning operation. When a copying operation is carried out by using an automatic document feeder in such a copying machine, after a copy scanning operation for one sheet of an original is ended, the carriage must be once returned even in a time period until a prescanning operation for the next original is performed.

However, when the above-described returning operations are continuously performed, the overall reading time will be consumed. For instance, the copy scanning operation is performed one time for a black-and-white original, whereas the copy scanning operations are carried out four times for a color printed original since the reading operations are performed with respect to four colors, i.e., black, yellow, magenta, and cyan used by a copying machine. As a result, the carriage is reciprocated two times as to a single sheet of black-and-white original, whereas the carriage is reciprocated five times as to a single sheet of color printed original. In other words, the carriage must be returned two times for a single black-and-white original, whereas the carriage is returned five times for a single color original.

In the above-described prescanning operation, the carriage is first transported from the home position over the substantially entire length of the platen glass. During this carriage transport, when the original is a regular sized original, the size of this original is detected (original detection scanning operation). Alternatively, when the original is an irregular sized original, the size of this original is detected in addition to the AE scanning operation and the ACS scanning operation while the carriage is returned immediately after the original detection scanning operation, depending upon a certain sort of copying machines. In this case, the attribute of the original is detected during each of go and return transports of the carriage, so that the returning time of the carriage may be effectively utilized.

However, even in this case, the returning time of the carriage is not shortened. In other words, this returning time of the carriage would necessarily prolong the overall reading time. Moreover, since the carriage is moved over the substantially entire length of the platen glass during the original detection scanning operation, the shorter the size of the original becomes, the longer the prescanning time is consumed. These factors may cause the following disadvantages. That is, when no attribute of the original is set by using the user interface, the temporal efficiencies of the reading/copying operations are greatly lowered, as compared with that when the attribute of the original is set.

On the other hand, in color copying machines, a time interval should be set longer than a preselected value, and this time interval is defined between end timing of an image reading operation and start timing of an image output operation to a sheet of paper, e.g., a copy sheet (for example, timing when a sheet is absorbed onto transfer drum, and latent writing timing to photoreceptor drum). As an example, when the sheet is absorbed onto the transfer drum, if the proper timing has once missed, then the waiting should be effected for several seconds until the transfer drum makes one rotation. As a result, if the reading time required for a single sheet of original is slightly prolonged, then a large delay is produced in outputting of the image, which may reduce the copying efficiency. Under such a circumstance, there are strong demands to shorten the overall image reading time by reducing the time required to return the carriage.

In general, as a consequence, the returning operation of the carriage after the copy scanning operation is made faster than the going operation of this carriage. Also, after the copy scanning operation of one original is accomplished, the automatic document feeder is driven at the same time when the returning operation of the carriage is commenced, so that this original is replaced by the next original, and the prescanning operation of the next original is prepared. However, when the original replacement is carried out at the same time when the carriage is returned in a high speed, the power consumption will be increased.

In the conventional technique as disclosed in Japanese Unexamined Patent Publication No. Hei. 1-291272, in the image processing apparatus containing the automatic document feeder, while the original is transported over the platen glass to a preselected position, the optical system is back-scanned. During this back scanning operation, the density data of the original is detected, and then the image process condition is controlled in accordance with this detected density.

However, when this conventional method is introduced, while the original is fed by driving the automatic document feeder, the carriage for mounting thereon the optical system must be driven in order that the optical system is back-scanned. As a result, although the total time required to perform the image process operation can be shortened, the temporally required amount of power consumption would become excessively large. This may cause this copying machine to be brought into the inoperative state under usual power supply conditions in general offices.

To avoid the problem of an increased power consumption, the following measure may be conceived. That is, when an original is replaced, the power supplied to units that consume much power which are disposed on the image output side, such as an image fusing device for fusing an image transferred onto a copy sheet may be temporarily reduced or turned off. However, this measure may eventually make it difficult to shorten the image copying time.

SUMMARY OF THE INVENTION

The present invention has been made in view of the above-described problems, and has as an object to provide a document reading apparatus and a document reading method capable of reducing power consumption and as well as shortening the overall document reading time.

To attain the above object, according to the invention, there is provided a document reading apparatus comprising original storing means for storing therein a plurality of originals; mounting means on which one of the originals is to be mounted; automatic original feeding means for feeding the originals from the original storing means one by one, and for temporarily stopping each of the originals on the mounting means; reading means for reading an image of the original stopped on the mounting means; first transporting means for transporting the reading means in a first direction to allow the reading means to read the image of the original stopped on the mounting means; holding means for holding the reading means at a first position near an image reading end position after reading of the image of the original by the reading means is completed; and second transporting means for transporting the reading means in a second direction opposite the first direction from the first position to allow the reading means to read an attribute of a next original after the next original is stopped on the mounting means by the original feeding means.

With employment of this configuration, the reading means reads the image of the original while being transported in the first direction. After completion of this image reading operation, the reading means reads the attribute of the next original while being transported in the second direction from the first position. As a result, a useless time can be eliminated in which the reading means is returned in the second direction without performing any reading operation after the image of the preceding original has been read. Thus, the original reading time can be shortened. In this case, stopping the next original on the mounting means by the automatic original feeding means is subject to a necessary condition that reading of the image of the preceding original is completed. Further, reading of the attribute of the next original is not commenced unless the next original is stopped on the mounting means. Accordingly, none of the transporting means and the reading means are not driven at the same time as the automatic original feeding means is driven. Therefore, the possibility that the power consumption becomes too large at a certain time point is very low.

Examples of the attribute of an original are an image density, text and image sections, discrimination between a color image and a black-and-white image, an image edit marking, and a color designated for an edit operation, and combinations thereof.

It is preferred that the above configuration further comprise third transporting means for transporting the reading means in the first direction from the first position to a second position after the reading of the image of the original is completed and before the reading means is held by the holding means.

In this case, the reading means is further transported in the first direction from the first position that is near the image reading end position of the preceding original. Therefore, when the reading means is again activated to read the attribute of the next original, there is a temporal margin from this activation until a time point when the reading means reaches the next original. This is advantageous in a case of using a reading means which requires a long time to reach the effective operating condition after the activation.

Further, it is preferred that the above configuration further comprise size detecting means for detecting a size of the original while the original is fed toward the mounting means by the automatic original feeding means; and setting means for setting, on the original, a reading range to be read by the reading means based on the detected size of the original.

In some conventional prescanning operations, the size of an original is detected during one of go and return transports and detection of the density of the original, color/black-and-white discrimination of the original, etc. are performed during the other transport. In this case, the prescanning time cannot be easily shortened. In contrast, by detecting the size of an original at the stage of feeding the original by the automatic original feeding means as described above, a transport in one direction of the prescanning operation can be eliminated. Accordingly, as explained above, it is possible to readily achieve an effective operation that not only can an image of a preceding original be read but also the attribute of the next original can be read (prescanning) as the reading means is reciprocated only once.

According to the present invention, there is provided a document reading method comprising the steps of causing reading means to read an attribute of an original stopped on mounting means; causing the reading means to read an image of the original stopped on the mounting means while transporting the reading means in a first direction; holding the reading means at a first position near an image reading end position after reading of the image of the original is completed; ejecting the original from the mounting means; feeding a next original from original storing means and stopping it on the mounting means; and causing the reading means to read an attribute of the next original stopped on the mounting means while transporting the reading means in a second direction opposite the first direction.

As in the case of the above-explained reading apparatus, this method can shorten the original reading time. Further, the steps of transporting the reading means and reading by the reading means do not overlap with the step of feeding an original from the original storing means to the mounting means, thereby avoiding useless energy consumption.

Further, according to the invention, there is provided a document reading method comprising the steps of (a) causing an automatic original feeding means to feed a first original from original storing means for storing a plurality of originals to mounting means; (b) stopping the first original on the mounting means; (c) causing reading means to read an attribute of the first original stopped on the mounting means; (d) causing the reading means to read an image of the first original stopped on the mounting means while transporting the reading means in a first direction; (e) holding the reading means at a first position near an image reading end position after reading of the image of the first original is completed; (f) ejecting the first original from the mounting means; (g) causing the automatic original feeding means to feed a second original from the original storing means to the mounting means; (h) stopping the second original on the mounting means; (i) causing the reading means. to read an attribute of the second original stopped on the mounting means while transporting the reading means in the second direction opposite the first direction; (j) causing the reading means to read an image of the second original stopped on the mounting means while transporting the reading means in first direction; (k) holding the reading means at the first position near the image reading end position after reading of the image of the second original is completed; ejecting the second original from the mounting means; and (m) repeating steps (g) to (l) executed in connection with the second original as to subsequent originals.

This method provides similar advantages as described above. In addition, since originals are continuously fed, the overall reading time can be shortened.

Various modifications and changes similar to those described above in connection with the reading apparatus can also be made in the above-mentioned document reading methods.

Further, in the document reading methods of the present invention, the step of causing the reading means to read the attribute of the original may comprise the substeps of detecting a size of the original as the attribute, and setting, on the original, a reading range to be read by the reading means based on the detected size of the original.

For instance, where a solid-state image sensor such as a CCD or a BBD is employed as the reading means, it is also possible to detect, as one of attributes of an original, the size of the original as well as the image density. This is compatible with the above methods because this is not the type of operation in which the attributes of an original are not read as the reading means is reciprocated.

In particular, if the above operation is combined with another type of operation in which the size of an original is detected by the size detecting means provided in the automatic original feeding means and the reading range, on the original, of the reading means is set based on the detected size of the original, the size detection accuracy can be improved.

DESCRIPTION OF THE PREFERRED EMBODIMENT

Figure 1:
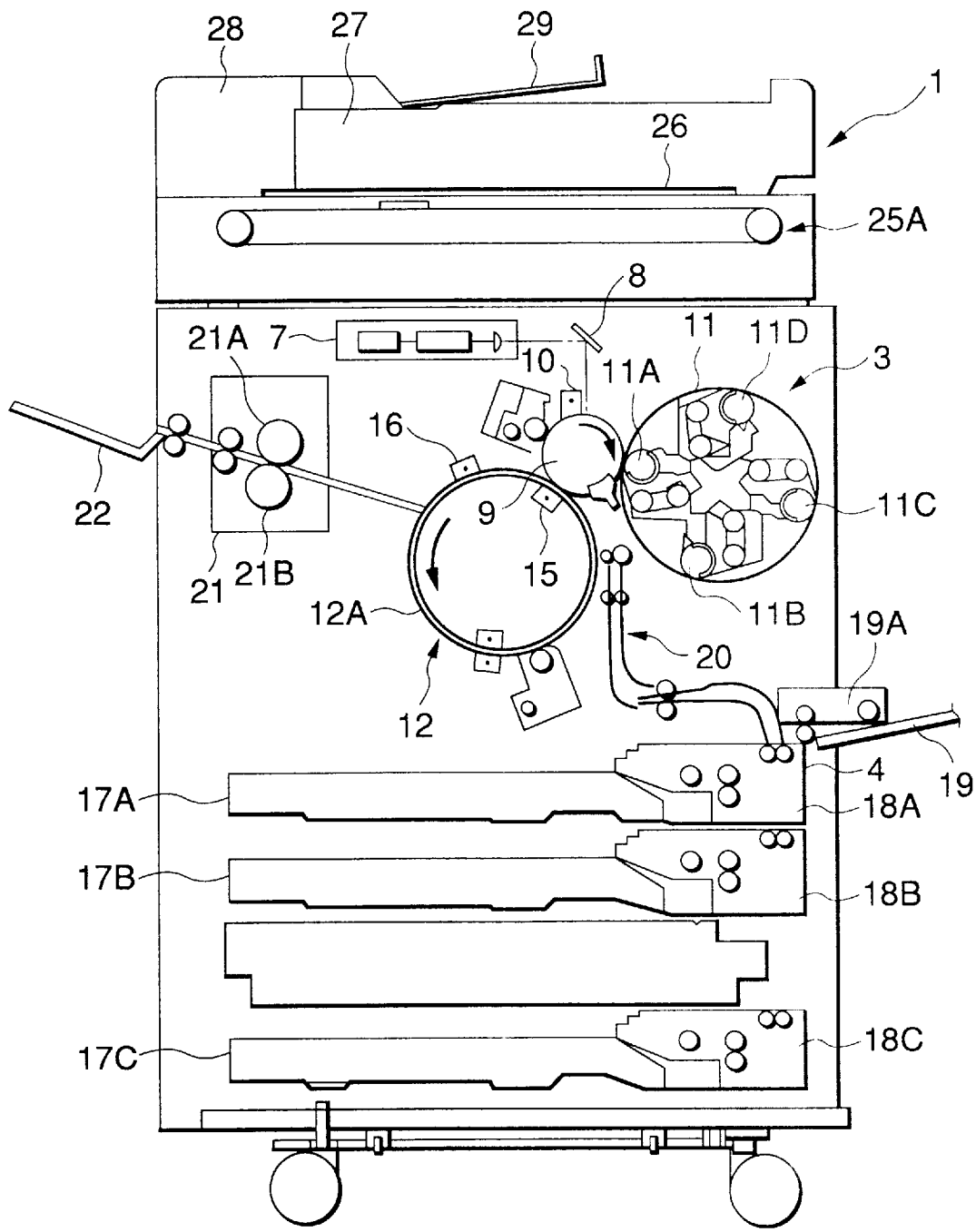
FIG. 1 is a front view for showing the overall structure of an electrostatic color copying machine equipped with a document reading apparatus according to an embodiment of the present invention.

Referring now to the drawings, an embodiment of the present invention will be hereinafter described.

A. Overall Structure of Copying Machine

FIG. 1 is a front view showing the overall structure of an electrostatic color copying machine equipped with a document reading apparatus according to an embodiment of the present invention. This electrostatic color copying machine has an image input unit 1, an image forming unit 3, and a paper supply unit 4.

The image forming unit 3 is equipped with a photoreceptor drum 9, a charge corotron 10, an exposing unit 7, a developing unit 11, a transfer drum 12, a transfer corotron 15, a cleaner, and other components, which are arranged around this photoreceptor drum 9. The photoreceptor drum 9 is rotary driven along a direction indicated by an arrow. The charge corotron 10 uniformly charges a surface of the rotated photoreceptor drum 9. The exposing unit 7 irradiates laser light in accordance with an image that is input through the image input unit 1. This laser light is reflected from a mirror 8, and then is irradiated onto the surface of the charged photoreceptor drum 9, resulting in forming of an electrostatic latent image.

The developing unit 11 is a rotary type drum equipped with four developing devices 11A–11D. The developing devices 11A–11D supply black toner, yellow toner, magenta toner, and cyan toner to the photoreceptor drum 9, respectively. Every time the photoreceptor drum 9 is rotated one time, any one of these developing devices 11A–11D supplies the toner to the photoreceptor drum 9, so that single-colored toner is adhered to the electrostatic latent image. Then, these toner images are successively stacked on a sheet absorbed on the transfer drum 12, so that a color toner image is formed on the sheet.

The transfer drum 12 is made by supporting a cylindrical shaped film 12A between two sets of disk-shaped supporting members, and this transfer drum 12 is rotary-driven along a direction indicated by an arrow in FIG. 1. The transfer drum 12 is arranged adjacent to the photoreceptor drum 9. The sheet is transported on the transfer drum 12 by a transport device 20 equipped with a paper supply unit 4 and a plurality of rollers. This sheet is supported with being adhered to the transfer drum 12, and passes through a nip between the photoreceptor drum 9 and the transfer drum 12 in conjunction with the rotations of the transfer drum 12.

The transfer corotron 15 is arranged within the transfer drum 12 in the fixed manner. This transfer corotron 15 is positioned opposite to the nip. When the sheet passes through this nip, the toner image formed on the photoreceptor drum 9 is attracted to the sheet by electric fields produced by the transfer corotron 15 so as to be transferred onto this sheet.

As will be discussed later, the transfer corotron 15 may have another function to adhere the sheet to the transfer drum 12.

After the toner image has been transferred, the surface of the photoreceptor drum 9 is cleaned by the cleaner equipped with a cleaning blade. A stripping corotron 16 is arranged in the vicinity of the transfer drum 12, and produces an electric field in such a direction that the sheet onto which the toner image has been transferred is stripped off from the transfer drum 12. As a result, the sheet is stripped off from the transfer drum 12.

On the left side of the transfer drum 12 as viewed in this drawing, a heat-fusing device 21 is arranged, and this heat-fusing device 21 is equipped with a heat roller 21A and a pressure roller 21B. The sheet stripped by the stripping corotron 16 is transported to the heat-fusing device 21. Since this sheet is heated and pressured between the rollers 21A and 21B, the toner image on the sheet is fused and, at the same time, the colored toner image is produced. Thereafter, the sheet is ejected to an ejection tray 22.

The paper supply unit 4 is equipped with paper supply trays 17A–17C for storing sheets having different sizes, and a hand delivery tray 19. The paper supply trays 17A–17C are attached with paper supply mechanisms 18A–18C, respectively. The sheets are supplied toward the transport device 20 by the respective paper supply mechanisms 18A–18C. Also, the hand delivery tray 19 is attached with a paper supply mechanism 19A, and the sheet is supplied to the transport unit 20 by this paper supply mechanism 19A.

B. Structure of Document Reading Apparatus

The image input unit 1 corresponding to the document reading apparatus according to the present invention is equipped with a reading unit 25 and an automatic document feeder 28. In FIG. 1, as to the reading unit 25, only a cabinet 25A thereof is shown. A transparent platen glass 26 for mounting thereon an original is arranged on this cabinet 25A. Also, a platen cover 27 is hinged with the cabinet 25A.

The automatic document feeder 28 equipped with an original tray 29 capable of storing a plurality of originals is provided with this platen cover 27. The original stored in the original tray 29 is fed one by one to the platen glass 26 by this automatic document feeder 28.

Figure 2:
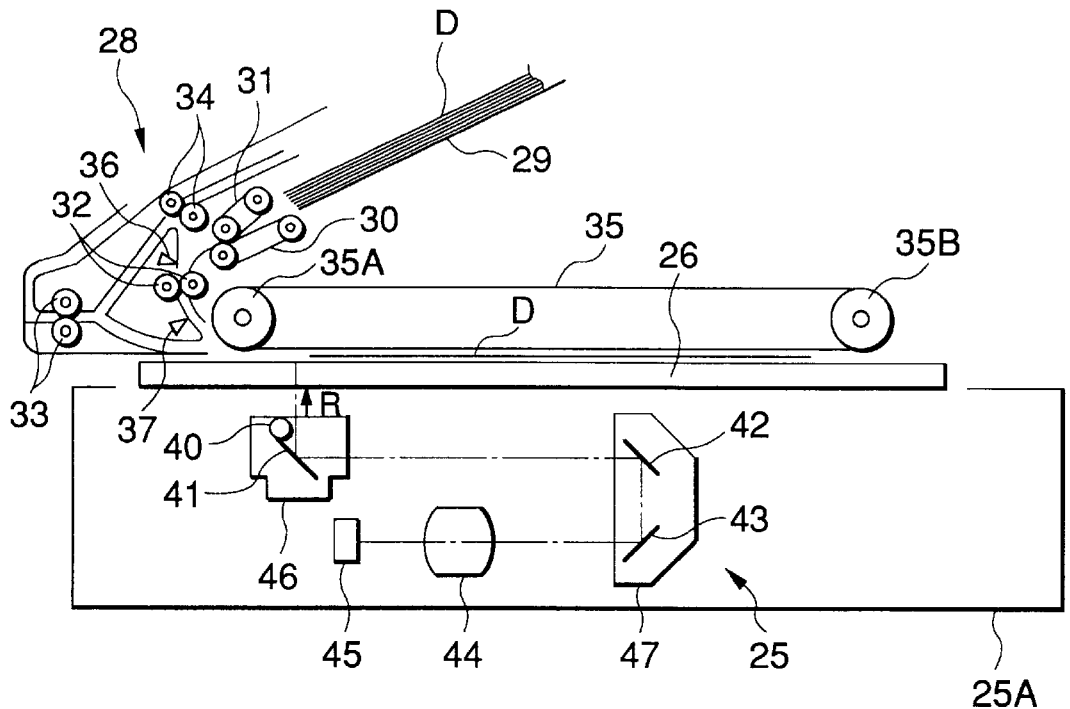
FIG. 2 is an enlarged front sectional view of the document reading apparatus of FIG. 1 in a state that carriages are located at home positions.

As indicated in FIG. 2, the automatic document feeder 28 is equipped with a feed belt 30 for transporting an original D stored in the original tray 29, a retard belt 31 for blocking transports of more than two sheets of originals D, and a feed roller 32 for supplying one sheet of original D which has passed through the belts 30 and 31 onto the transparent platen glass 26. Also, the automatic document feeder 28 is provided with a reverse roller 33 and a guide roller 34. The reverse roller 33 reverses the original D whose both surfaces are read. The guide roller 34 guides the reversed original D between the belts 30 and 31.

Furthermore, the automatic document feeder 28 is equipped with a transfer belt 35 used to move and stop the original D on the platen-glass 26. The transfer belt 35 is arranged within the platen cover 27 shown in FIG. 1, and is wound around a drive roller 35A and a follower roller 35B.

Then, the transfer belt 35 transfers the original D supplied via the feed roller 32 to a predetermined position on the platen glass 26, and then stops this original D. Concretely speaking, after the reading operation is completed, the transfer belt 35 transfers this read original toward an ejecting unit (corresponding to upper surface of platen cover 27) between the reverse roller 33 or the transfer belt 35 and the original tray 29.

It should be noted that reflection type photosensors 36 and 37 are provided inside the automatic document feeder 28. As a result, these photosensors 36 and 37 can sense the completion of the original transport and can monitor jamming of the originals. Moreover, it is possible to detect a length of an original D along the feeding direction based on the feeding speed of the original D, and a difference between the timing when the tip portion of the original D passes through the photosensor 36, and the timing when the rear end thereof passes through the photosensor 36. Also, a plurality of photosensors 36 are arranged along the vertical direction of the drawing plane, as viewed in FIG. 2, so that it is also possible to detect another length of the original D along the vertical direction, namely a width thereof.

Next, the reading unit 25 will now be described in detail. Reference numeral 40 indicates a lamp for irradiating light onto the platen glass 26 located in the upper direction. As this lamp 40, for instance, a halogen lamp may be employed. The light which has passed through the platen glass 26 is reflected by either the lower surface of the original D or the outer peripheral surface of the transfer belt 35. This reflection light passes through the platen glass 26, and is reflected by a mirror 41 at 90°, and further is reflected by mirrors 42 and 43 by 90°, respectively. Then, this reflection light is focused onto an image sensor 45 by a lens 44. As the image sensor 45, for instance, a CCD (charge-coupled device) is used. The reflection light is photoelectrically converted by this CCD, and the surface of the original is scanned along the vertical direction, namely the main scanning direction.

Figure 3:
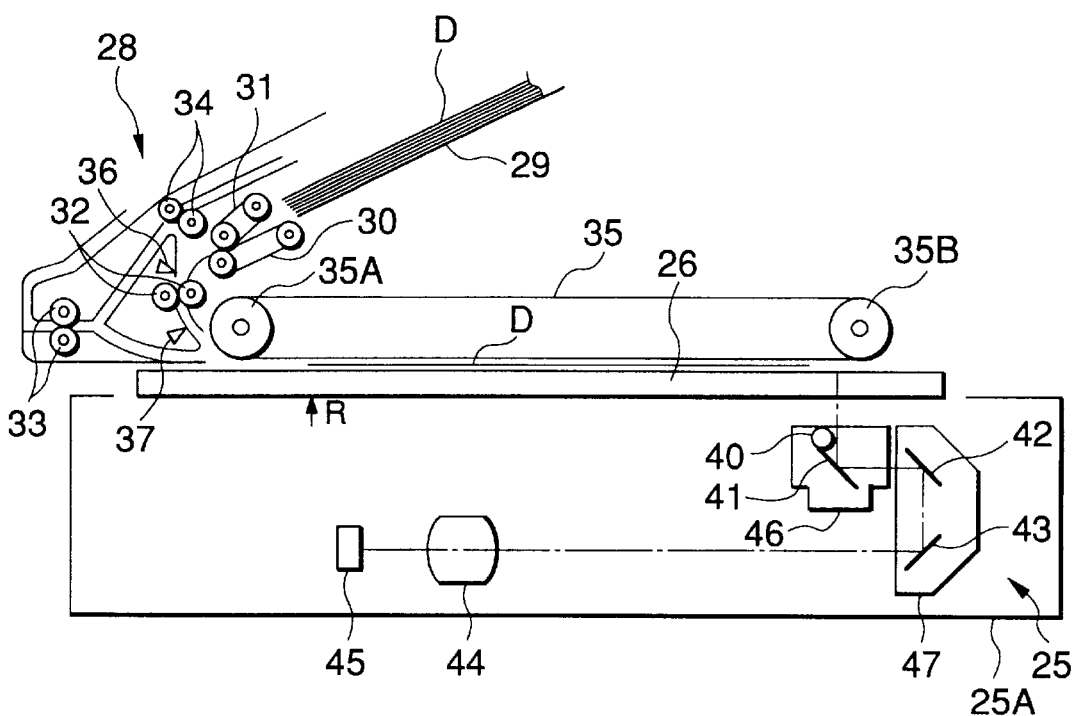
FIG. 3 is an enlarged front sectional view of the document reading apparatus of FIG. 1 in a state that the carriages are located at prescan end positions.

In this case, both the lamp 40 and the mirror 41 are mounted on a first carriage 46, whereas both the mirror 42 and the mirror 43 are mounted on a second carriage 47. As indicated in FIG. 2 and FIG. 3, the first and second carriages 46 and 47 are transportable along a transverse direction in this drawing, namely the sub-scanning direction. Theses carriages 46 and 47 are supported by a guide rail (not shown), and are guided along the sub-scanning direction. This illustration of the guide rail is omitted. Since the carriages 46 and 47 are moved in the above-described manner, the image can be read over the substantially entire surface of the platen glass 26.

Figure 4:
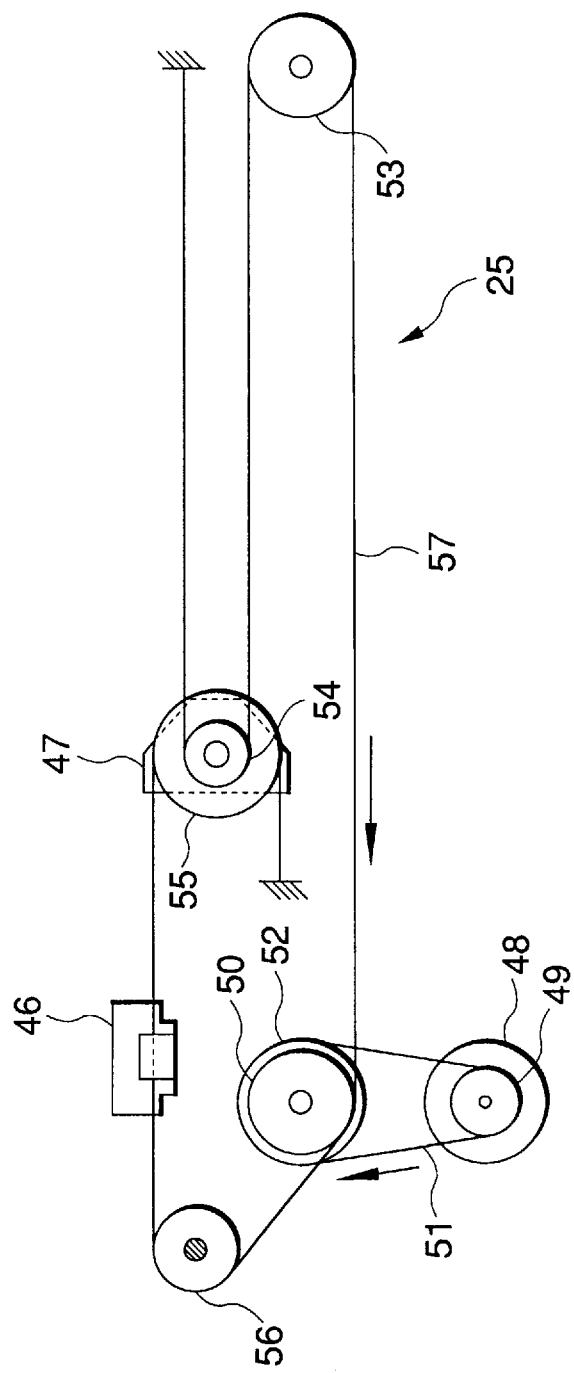
FIG. 4 is a front view of a drive mechanism for the carriages shown in FIG. 2.

A drive mechanism of these first and second carriages 46 and 47 is illustrated in FIG. 4. In FIG. 4, reference numeral 48 shows a stepper motor. A timing pulley 49 is fixed on a rotation shaft of the stepper motor 48. The rotation of the timing pulley 49 is transferred via a timing belt 51 to the timing pulley 50. In this drawing, a movable pulley 53 is movably arranged on the right side of FIG. 4 along the lateral direction, and a fixed pulley 56 is rotatably mounted on a fixed shaft on the left side.

On the other hand, an inside idler pulley 54 and an outside idler pulley 55 are arranged on the second carriage 47. These pulleys 54 and 55 are separately and rotatably mounted in a coaxial manner. Reference numeral 57 shows a scan cable made by a copper twisted line covered with nylon. One edge portion of this scan cable 57 is fixed to a frame within the cabinet 25A. Then, the scan cable 57 is wound on the inside idler pulley 54, the variable pulley 53, the main pulley 52, the fixed pulley 56; and the outside idler pulley 55 in this order. The other edge portion of this scan cable 57 is fixed on another frame in the cabinet 25A. Then, the first carriage 46 is fixed between the outside idler pulley 55 and the fixed pulley 56 to the scan cable 57.

In the above-described structure, when the stepper motor 48 is rotated and then the timing belt 51 is traveled along an arrow direction shown in FIG. 4, the scan cable 57 is traveled along another arrow direction shown in FIG. 4. In this case, since the shaft of the fixed pulley 56 is fixed, and both the shaft of the variable pulley 53 and the common shaft of the pulleys 54 and 55 are movable along the lateral direction, deviation of the first carriage 46 may become twice as that of the second carriage 47. In FIG. 3, an interval between the carriages 46 and 47 is narrowed. As a consequence, the above-explained light path defined from the lamp 40 to the image sensor 45 is made equal to each other before the carriages 46 and 47 are moved, and after the carriages 46 and 47 have been moved.

It should be noted that under a condition shown in FIG. 2, the lamp 40 irradiates the light outside the registration position "R." This state is defined as a state that the carriages 46 and 47 are located at home positions. From this condition, the reading operation of the image by the reading unit 25 is commenced.

Also, FIG. 3 represents a reading limit state of the reading unit 25, i.e., a state that the carriages 46 and 47 can no longer move rightward as viewed in this drawing. This state is defined as a state that the carriages 46 and 47 are located at prescan end positions.

C. Control System of Copying Machine

Figure 5:
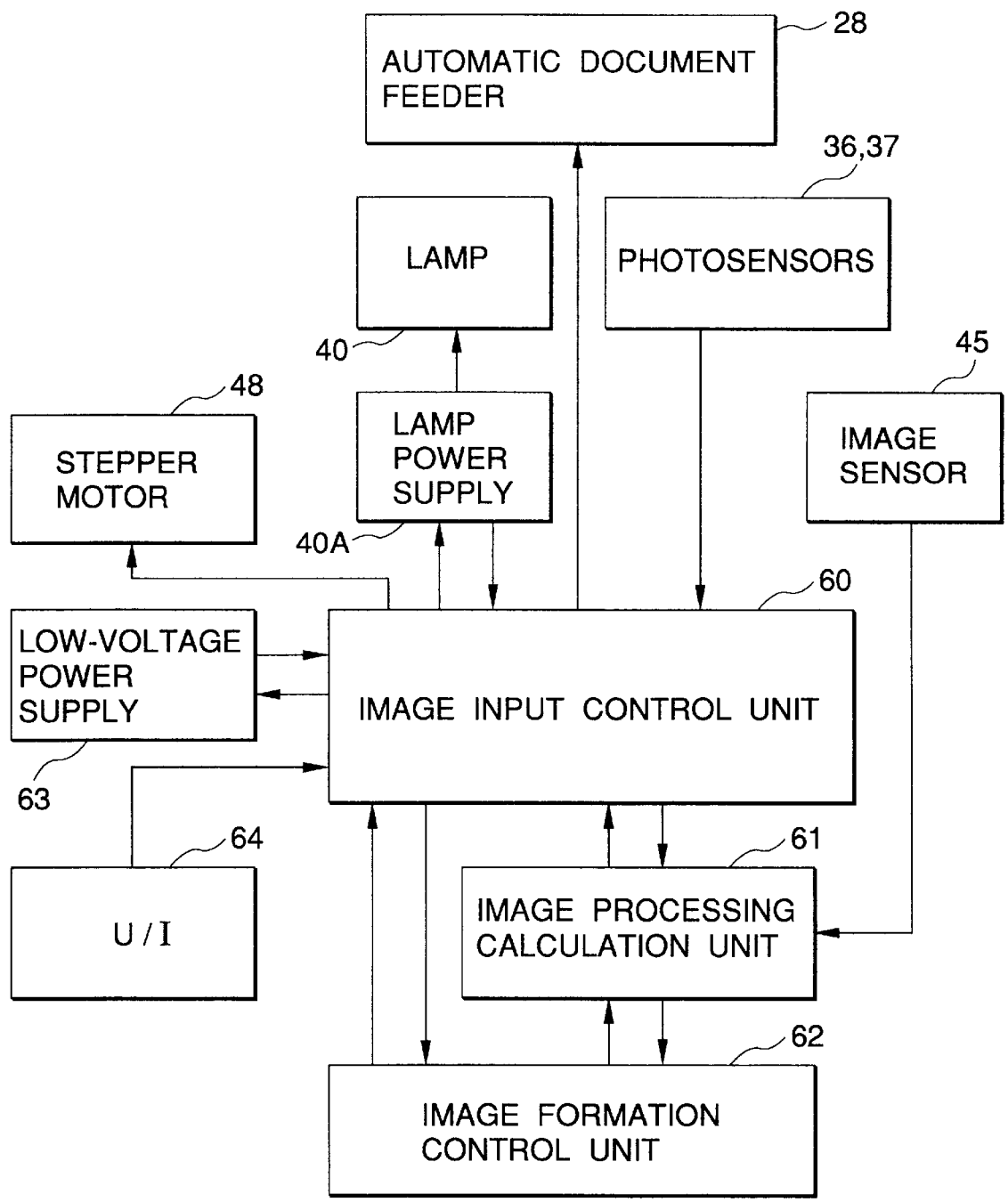
FIG. 5 is a block diagram showing a control system of the copying machine shown in FIG. 1.

FIG. 5 represents a control system of the above-described copying machine. As shown in FIG. 5, in this copying machine, there are separately provided an image input control unit 60 for controlling the image input unit 1; an image processing calculation unit 61 for executing a calculation process of a read information signal which is photoelectrically converted and scanned by the image sensor 45; and an image formation control unit 62 for executing controls of various sorts of devices in the image forming unit 3 and the paper supply unit 4. Each of these units 60–62 owns a CPU, a memory, and a timer. Then, the control signals are transferred/received among the units 60–62, so that harmonized operations are available in the image input unit 1, the image forming unit 3, and the paper supply unit 4.

The image input control unit 60 is driven by a low voltage power supply 63, and controls various sorts of devices employed in the image input unit 1 such as the automatic document feeder 28, the lamp 40, and the stepper motor 48 in response to various instruction signals supplied from the user interface 64. In this case, the lamp 40 is energized by another lamp power supply 40A different from the low voltage power supply 63. The image input control unit 60 supplies an on/off signal to the lamp power supply 40A so as to energize the lamp 40 for a necessary time period. Also, the image input control unit 60 supplies a signal indicative of the normal rotation, reverse rotation, or stop operation to the stepper motor 48, so that the operations of the first and second carriages 46 and 47 are controlled.

The on/off signal is inputted from the above-described photosensors 36 and 37 to the image input control unit 60. In response to this on/off signal, the image input control unit 60 judges transport conditions of the original D and the size of the original D. To judge this size of the original D, it is assumed that the time when the original D passes through the photosensor 36, which is obtained in response to the on/off signal of the photosensor 36, corresponds to a length of the original D along the sub-scanning direction. Also, another length of the original D along the main scanning direction corresponds to a width thereof by way of a plurality of photosensors arranged along the vertical direction, as viewed in FIG. 2.

Then, the image input control unit 60 calculates the drive time of the automatic document feeder 28, the light emission time of the lamp 40, and the rotation time (namely, travel distances of carriages 46 and 47) of the stepper motor 48 based on these judgment information. In other words, in the image input control unit 60, data corresponding to the reading range of the original is set. It should be noted that these judgment information is also supplied to the image processing calculation unit 61 and the image formation control unit 62.

The image processing calculation unit 61 receives the readout information signal form the image sensor 45. In the reading unit 25, the copy scanning operation is carried out. As a result, when the image information signal of the original D is inputted as the read information signal, the image processing calculation unit 61 converts the image information signal into an electrostatic latent image forming signal in accordance with a predetermined algorithm, and then supplies this electrostatic latent image forming signal via the image formation control unit 62 to the exposing unit 7 (see FIG. 1).

Also, when no designation is made of density of an image to be formed via the user interface unit 64, the AE scanning operation is carried out before reading the image of the original D, and a density information signal of the image of the original D is inputted from the image sensor 45 as the read information signal to the image processing calculating unit 61. In this case, the image processing calculation unit 61 samples the density information signal. Then, the image processing calculation unit 61 varies a coefficient contained in the process algorithm for converting the image information signal into the electrostatic latent image forming signal based on this sampling result when the above-described image information signal is inputted, so that the density of the image to be formed is properly set.

Furthermore, when no designation is made as to whether a color image or a black-and-white image is to be formed via the user interface 64, the ACS scanning operation is carried out before reading the image of the original D, the color/black-and-white discriminating information signal of the original D is supplied from the image sensor 45 as the read information signal to the image processing calculation unit 61. In this case, the color/black-and-white discriminating information signal is supplied from the image processing calculation unit 61 to the image input control unit 60 and the image formation control unit 62. In response to this signal, the image formation control unit 62 controls the developing unit 11 (see FIG. 1). When it is judged that a color image is to be formed, the image input control unit 60 controls the lamp 40 and the stepper motor 48 in order to execute the copy scanning four times with respect to the respective colors, i.e., black, yellow, magenta, and cyan. On the other hand, when it is Judged that a black-and-white image is to be formed, the image input control unit 60 controls the lamp 40 and the stepper motor 48 in order to perform the copy scanning operation one time.

It should be understood that when neither the image density nor the color/black-and-white discrimination is designated via the user interface 64, an AE/ACS scanning operation is carried out in which both the AE scanning operation and the ACS scanning operation are executed at the same time.

D. Document Reading Operation

Figure 6:
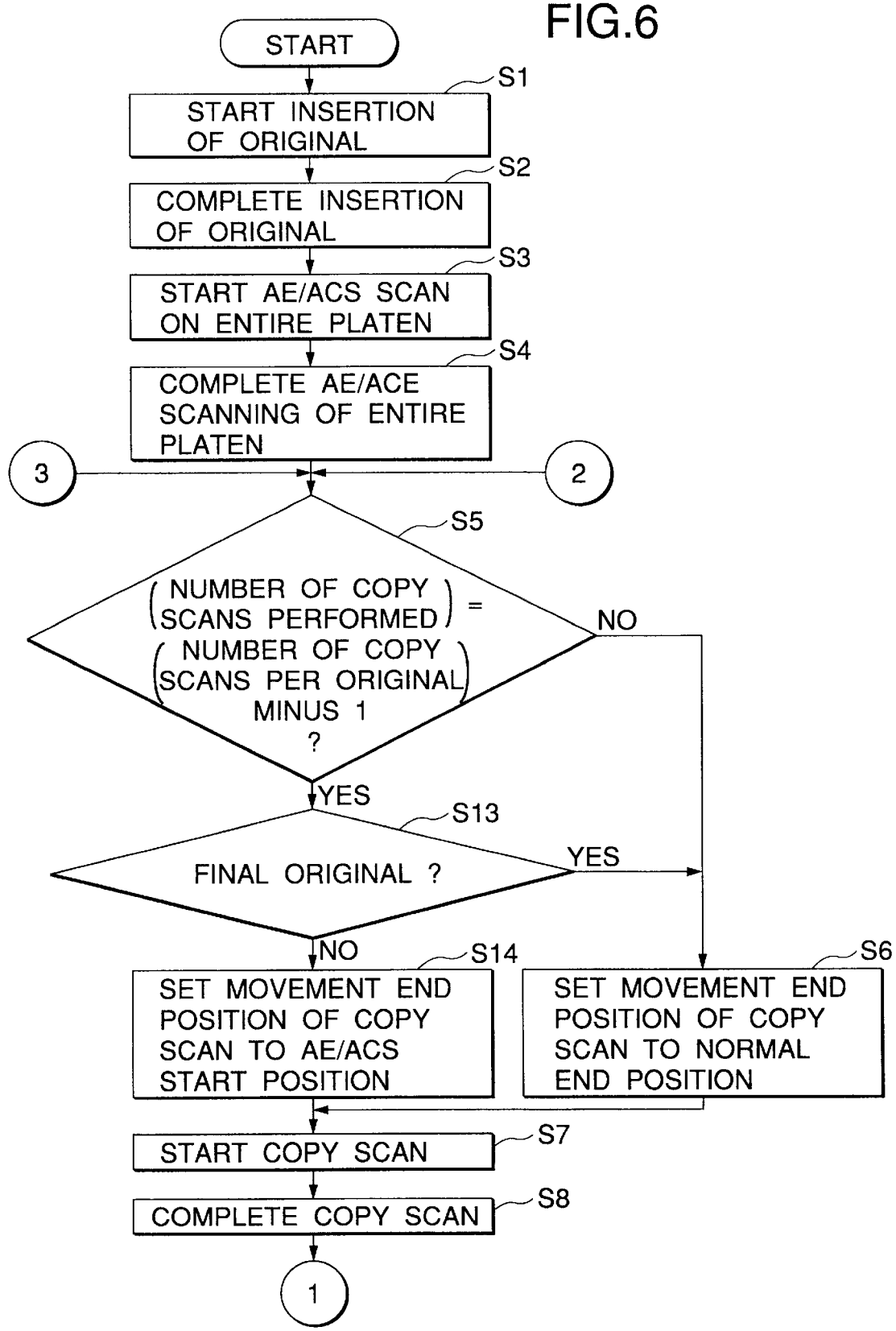
FIGS. 6 and 7 are a flowchart showing a process executed by the document reading apparatus of FIG. 2.
Figure 7:
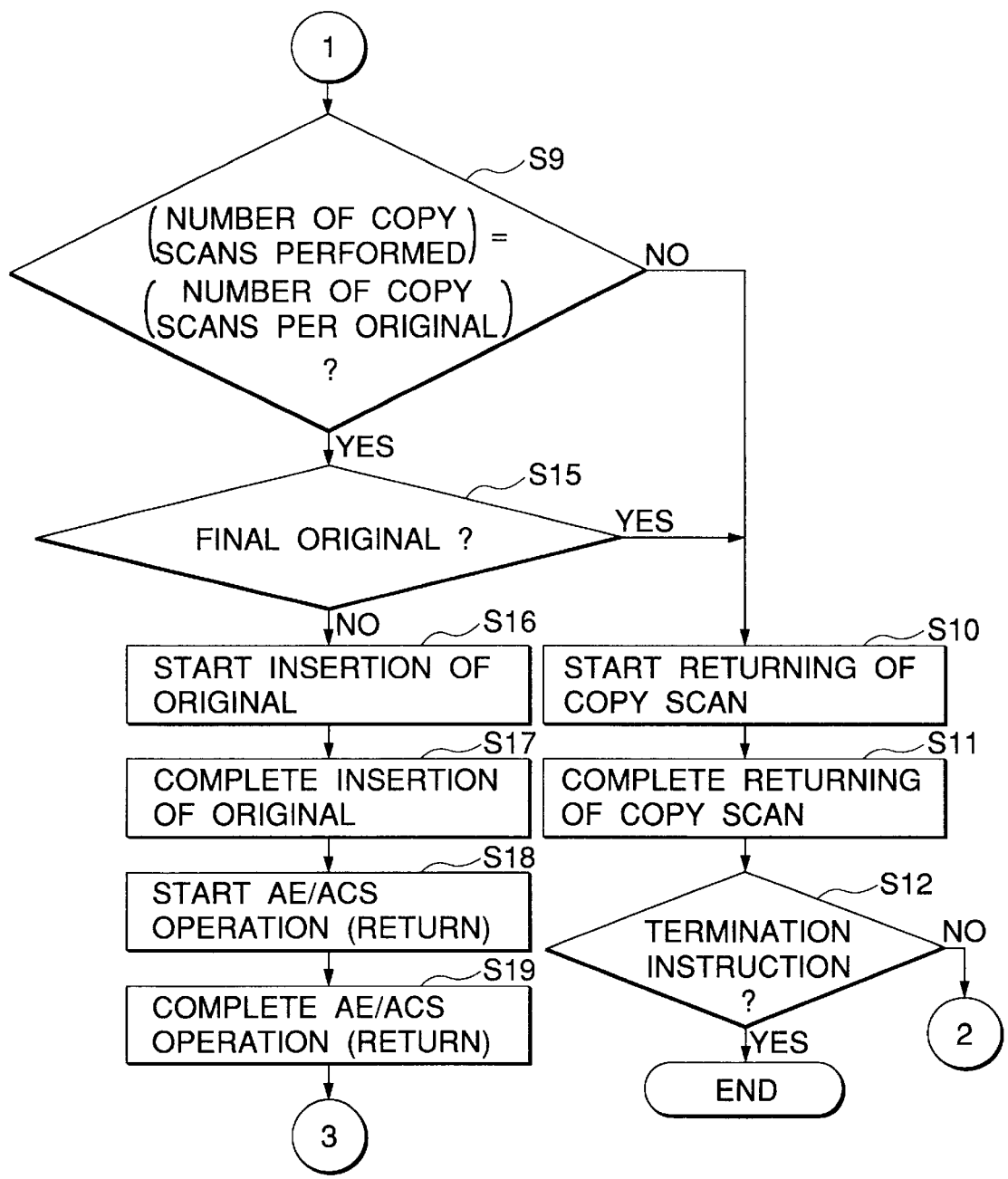

Next, operations of the document reading apparatus according to the present invention will now be described with reference to flowcharts shown in FIG. 6 and FIG. 7. The following descriptions are based on the assumptions that no density of an image to be formed is designated via the user interface 64, and no designation is made as to whether a color or black-and-white image is to be formed.

D-1 AE/ACS scanning operation for first original:

First, when a user pushes a copy start button of the user interface 64, the automatic document feeder 28 commences feeding of originals (step S1). Then, after a first original is inserted into a stationary state between the transfer belt 35 and the platen glass 26 (step S2), the AE/ACS scanning operation is carried out over the substantially entire length (more correctly speaking, between home position and pres-can end position) of the platen glass 26, so as to detect the density of this first original and discriminate between a color image and a black-white image (step S3). Since a color image and a black-and-white image can be discriminated from each other in this manner, the time of the copy scanning operation required for this original D can be judged. That is, if the original D is a color image, the copy scanning operations are required four times, whereas if the original D is a black-and-white image, the copy scanning operation is required only one time. Then, after the AE/ACS scanning operation is accomplished (step S4), the process operation is advanced to a step S5.

It should be understood that the AE/ACS scanning operation may be executed while the carriages 46 and 47 are transported from the home position shown in FIG. 2 up to the scan end position shown in FIG. 3, namely during either the going movement or the return movement. In any case, as to the AE/ACE scanning operation for the first original, the first carriage 46 is reciprocated over the substantially entire length of the platen glass 26, and after this AE/ACS scanning operation is ended, the carriages 46 and 47 are returned to the home position.

In accordance with this embodiment, a check is made as to whether or not the size of the original D is the regular size. If the original D has the regular size, then the original detection scanning operation for detecting the size of the original is not carried out. As previously explained, this is because the size of the original D under insertion is detected by the photosensor 36 provided in the automatic document feeder 28. Also for the same reason, even when there is the original D having the irregular size, this irregular size is not detected in connection with the AE/ACS scanning operation. However, alternatively, the size of the original D may be detected (will be discussed later).

D-2. First to third copy scanning operations for first color original:

Next, at the step S5, the number obtained by subtracting 1 from the times of the copy scanning operations required for the original D to be read, which can be judged at the steps S3 to S4 is compared with the number of the copy scanning operations which have been carried out for the original D to be read. Assuming now that it is judged at the steps S3 to S4 that the image of the original D is color, the former number is 3 and the latter number is still 0. As a result, the judgment result at the step S5 becomes "NO." Then, the process operation is advanced to a step S6, at which the end position of the copy scanning operation is set to the normal copy scan end position (to be discussed later).

Figure 8:
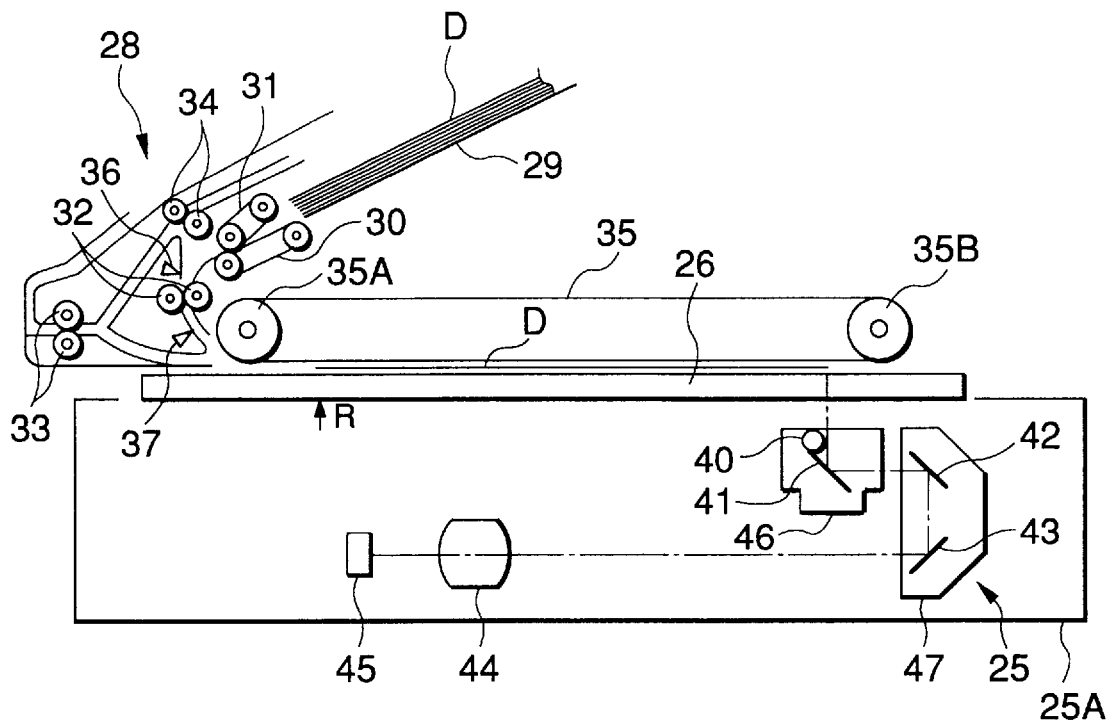
FIG. 8 is an enlarged front sectional view showing the document reading apparatus of FIG. 1 in a state that the carriages are located at scan end positions of a large-sized original.
Figure 9:
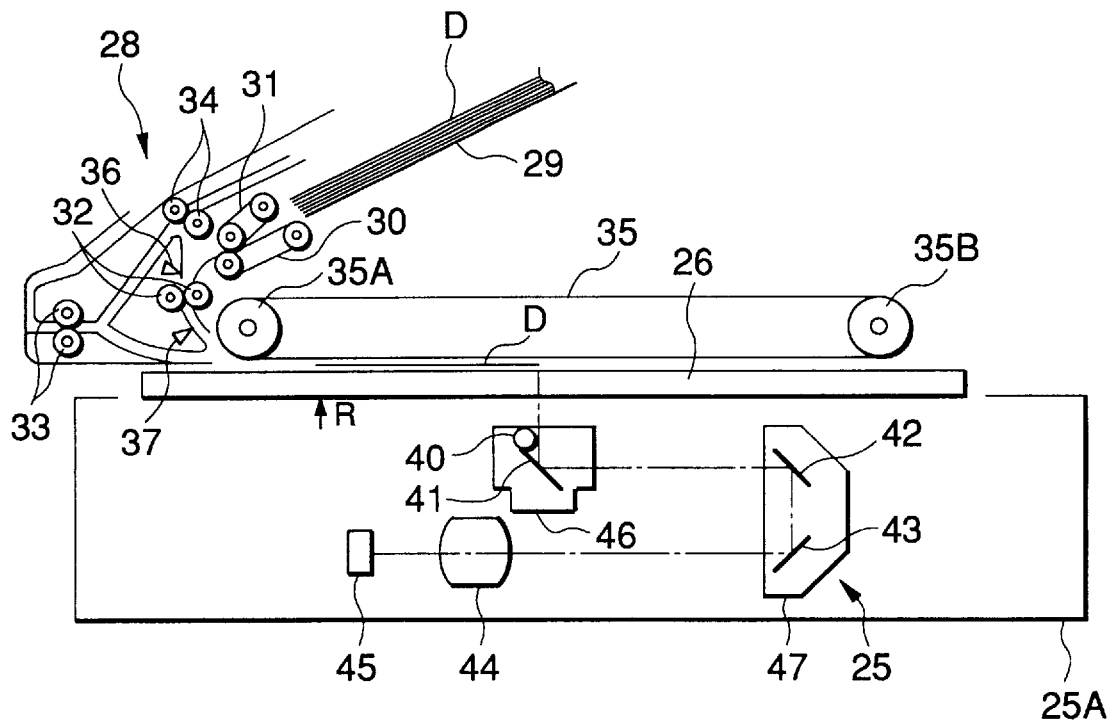
FIG. 9 is an enlarged front sectional view showing the document reading apparatus of FIG. 1 in a state that the carriages are located at scan end positions of a small-sized original.

Thereafter, the first copy scanning operation is actually commenced (step S7). In this copy scanning operation, the carriages 46 and 47 are started to be moved from the home position shown in FIG. 2. The acquisition of the image information signal from the image sensor 45 to the image processing calculation unit 61 is commenced at a time instant when the lamp 40 has passed the registration position "R." Then, as illustrated in FIG. 8 or FIG. 9, when the lamp 40 reaches the edge portion of the original D on the scan end side, this acquisition of the image information signal is accomplished. The position at this time corresponds to the normal copy scan end position set at the step S6, namely the end position of the copy scanning operation, and at this time, the carriages 46 and 47 are temporarily stopped (step S8). It should be noted that FIG. 8 represents a state that the carriages 46 and 47 are caused to stop at copy scan end positions for the original D having the maximum size readable by the reading unit 25, whereas FIG. 9 shows a state that the carriages 46 and 47 are caused to stop at another copy scan end positions for the original D having a small size.

Next, at a step S9, the number of the necessary copy scanning operations judged at the steps S3 to S4 is compared with the number of the copy scanning operations which have been carried out to the original D to be read. In this case, the former number is 4, and the latter number is 1. As a consequence, the judgment result at the step S9 becomes "NO." Thereafter, the carriages 46 and 47 are returned to the home position, so that the copy scanning operation is ended (steps S10 to S11), and the process operation is advanced to a step S12.

At the step S12, a check is made as to whether or not the completion of the copying operation has been instructed via the user interface 64. Then, if this completion instruction is issued, then the copying operation is completed. If no completion instruction is made, then the process operation is advanced to the step S5.

Subsequently, both the second copy scanning operation and the third copy scanning operation are executed in this order from the above-explained steps S5, S6 to S9, and S10 to S12. After the third copy scanning operation has been executed, the process operation is advanced to the step S5 unless the completion of the copy operation is instructed via the user interface 64.

D-3. Forth copy scanning operation for first color original:

After the third copy scanning operation has been executed, the judgment result at the step S5 becomes "YES." This is because both the number of the copy scanning operations which have been previously executed for the original D to be read, and the number obtained by subtracting 1 from the number of the necessary copy scanning operations for this original are 3, namely equal to each other. Then, a check is made as to whether or not this original D corresponds to a final original which is supplied via the automatic document feeder 28 onto the platen glass 26 (step S13). This judgment is made by sensing as to whether or not an original is left in the original tray 29 by using, for instance, a reflection type photosensor (not shown) arranged in the original tray 29.

In this case, when the original D is not the final original, the judgment result becomes "NO." Then, the process operation is advanced to a step S14, at which the end position of movement of the copy scanning operation is set to an AE/ACS scan starting position (to be explained later).

Figure 10:
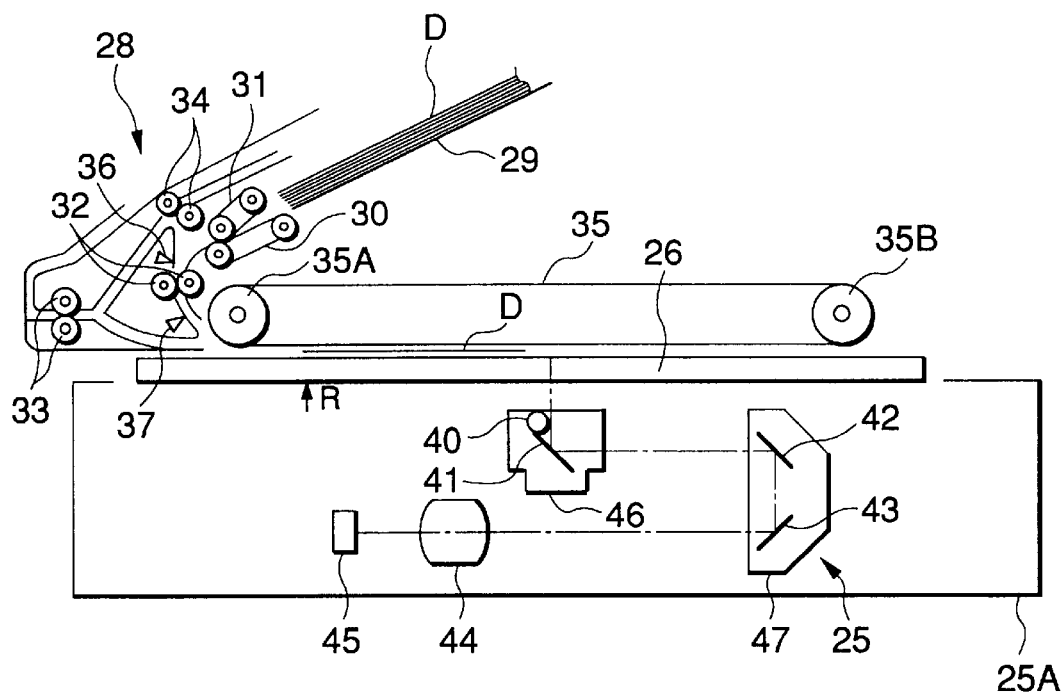
FIG. 10 is an enlarged front sectional view showing the document reading apparatus of FIG. 1 in a state that the carriages are located at AE/ACS scan start positions of a small-sized original.

Then, a fourth copy scanning operation is commenced (step S7). During this copy scanning operation, the carriages 46 and 47 are moved not to the above-described normal copy scan end position indicated in FIG. 8 or FIG. 9, but up to a position shown in FIG. 10, or a position near the position indicated in FIG. 3. In other words, the drive operation of the stepper motor 48 is continued in such a manner that the carriages 46 and 47 are moved by several centimeters from the position where the reading operation of the copy scanning operation is accomplished, further to the prescan end position.

Then, at this position, the carriages 46 and 47 are temporarily stopped (step S8). In other words, the carriages 46 and 47 are held by the stepping motor 48. This position corresponds to the movement end position of the copy scanning operation in this case, i.e., the AE/ACS can start position set at the step S14. It should be noted that FIG. 12 indicates a state that the first carriage 46 is stopped at the AE/ACS scan starting position for the original D having a small size.

Next, the process operation is advanced to a step S9, at which the number of the necessary copy scanning operations judged at the steps S3 to S4 is compared with the number of the copy scanning operations which have been carried out to the original D to be read. In this case, the former number is 4, and the latter number is 4. As a consequence, the judgment result at the step S9 becomes "YES," and then the process operation is advanced to a step S15.

At this step S15, a check is again made as to whether or not the original D supplied via the automatic document feeder 28 onto the platen glass 26 corresponds to the final original.

D-4. AE/ACS scanning operation for second original:

In the case that the original D is not equal to the final original at the step S15, the judgment result becomes "NO," and then the process operation is advanced to a step S16. At the step S16, the automatic document feeder 28 is driven, so that the original D which has been read is ejected, and then a new original D is transported from the original tray 29 to thereby be inserted between the transfer belt 35 and the platen glass 26.

Then, when the insertion operation of the original D is accomplished (step S17), the carriages 46 and 47 are returned from the AE/ACS scan start position where these carriages are stopped at the step S8, and then the AE/ACS scanning operation as to the second original D is commenced (step S18). Also, during this AE/ACS scanning operation, the density of this original D is detected and a color and a black-and-white image are discriminated from each other. As a consequence, the times of the copy scanning operations required for this original D can be judged. That is, if the original D is color, then the copy scanning operations are required four times. If the original D is a black-and-white image, only a single copy scanning operation is required. Then, after the AE/ACS scanning operation is ended (step S19), the process operation is advanced to the step S5 in a similar manner to that for the first original D.

As described above, after the final copy scanning operation of the original D which has been previously read is ended, the carriages 46 and 47 are not returned to the home position, but the AE/ACS scanning operation for the subsequent original D is carried out by utilizing the returning operation of this final copy scanning operation, so that the scanning time can be shortened.

The reason why the end movement position of the final copy scanning is set to the AE/ACS scanning start position at the above-described step S14 is given as follows. That is, commencing the AE/ACS scanning operation from the AE/ACS scanning start position corresponding to the position shown in FIG. 10 or the position near the position shown in FIG. 3 is advantageous in the build-up time of the lamp 40, as compared with a case where the AE/ACS scanning operation is commenced from the normal copy scanning end position shown in FIG. 8 or FIG. 9. While the preceding original D is substituted by the succeeding original D (steps S16 to S17), the lamp 40 is turned off. After the replacement of the originals D, the lamp 40 is turned on and returning of the carriages 46 and 47 is started. A certain time period is required after the lamp 40 is turned ON and then this lamp 40 will emit a sufficiently large amount of light. As a result, the lamp 40 is previously positioned on the scan end rather than the edge portion of the scan end side, so that the AE/ACS scanning operation can be sufficiently performed with respect to a wider reading range on the original D.

Similar to the AE/ACS scanning operation for the first original D, the size detection of the original D is not executed during the AE/ACS scanning operation. This is because the size of the original D under insertion is detected by the photosensor 36 provided on the automatic document feeder 28. If the size of the original D is different from the size of the previously read original, there is a large difference between the stroke of the AE/ACC scanning operation and the stroke of the copy scanning operation obtained from the detection result by the photosensor 36 with respect to the same original. However, normally, it is conceivable that the originals D having such different sizes are entered into the original tray 29 at the same time.

D-5. Copy scanning operation for second color original:

In the case that the original D is a color image, the above-explained first to third copy scanning operations with respect to the first original D, and the fourth copy scanning operation are subsequently carried out. Then, the judgment result at the step S9 becomes "NO," and the process operation is advanced to a step S15. At the step S15, when the original D is not equal to the final original, the judgment result becomes "YES," and then the process operation is advanced to a step S16. In other words, a similar process operation to the above-explained AE/ACS scanning operation for the second original is commenced. In this manner, a similar process operation is repeated until the original D becomes the final original.

D-6. Scanning operation for final color original:

Next, a description will be made of a case where the original D is the final one. First, an AE/ACS scanning operation for the final original is executed similar to that for the second original. Then, after the process operation is advanced from a step S19 to the step S5, the process operations defined at the steps S5, S6 to S9, and S10 to S12 are repeated three times, which is similar to that for the first color original and the second color original. Then, under a condition that these process operations are repeated and the scanning operations have already been executed three times, when the process operation is advanced to the step S5, this process operation is immediately advanced to a step S13. Since this original corresponds to the final original, the judgment result becomes "YES" at the step S13 and then the process operation is advanced to the step S6. At this time, although the process operation is immediately before the fourth copy scanning operation is executed, since there is no need to prepare the AE/ACS scanning operation of the next original, the movement end position of the copy scanning is set to the normal copy scan end position.

Thereafter, when the copy scanning operation is started and then is completed, the carriages 46 and 47 are caused to be stopped at the normal copy scan end position as shown in FIG. 8, or FIG. 9 (steps S7 to S8). Next, the process operation is advanced to a step S9. At this step S9, a judgment is made as to whether or not the number of the copy scanning operations which have already been executed is coincident with the number of the copy scanning operations which should be executed. If the judgment result becomes "YES," then process operation is advanced to a step S15. Since this original corresponds to the final original, this judgment result becomes "YES." At this time, a signal is produced in the image input control unit 60, which is equivalent to a case that a completion instruction is issued from the user interface 64. Subsequently, the carriages 46 and 47 are returned to be stopped at the home position (steps S10 to S11).

Next, the process operation is advanced to a step S12. Then, in response to the completion instruction signal produced from the image input control unit 60, the judgment result at the step S12 becomes "YES," so that the copying operation is ended.

D-7. Copy scanning operation for first black-and-white original:

As previously described, when the original D is an original having a black-and-white image, process operations defined up to the step S5 via the AE/ACS scanning operation for the first original (step S1 to S4) will now be explained. When the original D is a black-and-white, the number of the copy scanning operations necessary for the black-and-white original is one. As a result, the judgment result at the step S5 becomes "YES." Then, a check is done as to whether or not this original D corresponds to the final original which is supplied via the automatic document feeder 28 to the platen glass 26 (step S13).

Now, if the original D is not equal to the final original, then the judgment result becomes "NO," and the process operation is advanced to a step S14, at which the movement end position of the copy scanning operation is set to an AE/ACS scan starting position (to be discussed later).

Then, the copy scanning operation is carried out (step S7), and the carriages 46 and 47 are temporarily stopped at the AE/ACS scan starting position (step S8). This position corresponds to the end position of the copy scanning operation in this case, and thus to the AE/ACS scan starting position. As described above, the carriages 46 and 47 are held by the stepper motor 48.

Next, the process operation is advanced to a step S9. At a step S9, the number of the necessary copy scanning operations is compared with the number of the copy scanning operations which have been carried out to the original D to be read. In this case, the former number is 1, and the latter number is 1. As a consequence, the judgment result at the step S9 becomes "YES," and the process operation is advanced to a step S15. At this step S15, a check is again made as to whether or not the original D supplied via the automatic document feeder 28 onto the platen glass 26 corresponds to the final original.

D-8. Scanning operation for second black-and-white original:

In the case that the original D is not equal to the final original at the step S15, the judgment result becomes "NO," and then the process operation is advanced to the step S16. At the step S16, the automatic document feeder 28 is driven, so that the original D which has been read is ejected, and then a new original D is transported from the original tray 29 to thereby be inserted between the transfer belt 35 and the platen glass 26.

Then, when the insertion operation of the original D is accomplished (step S17), the carriages 46 and 47 are returned from the AE/ACS scan start position where these carriages are stopped at the step S8, and then the AE/ACS scanning operation as to the second original D is commenced (step S18). After this AE/ACS scanning operation is ended (step S19), the process operation is advanced to a step S5 in a similar manner to that for the first original D.

In the case that the original D is a black-and-white image, the same process operation is carried out which is executed for the scanning operation of the first black-and-white original. That is, the process operation is carried out in this order of the steps S5, S13, S14, S7, S8, S9, S15 unless the present original corresponds to the final original. In this manner, when the original is black and white, the movement and position of the copy scanning is necessarily set to the AE/ACS scan starting position unless the present original is the final original, and thus the operation is prepared for the AE/ACS scanning operation for the next original.

D-9. Scanning operation for final black-and-white original:

Where the original D is the final one, when the process operation is advanced from the step S5 to a step S13, the judgment result at the step S13 becomes "YES," and the process operation is advanced to the step S6. At this time, since there is no need to prepare the AE/ACS scanning operation of the next original, the movement end position of the copy scanning is set to the normal copy scan end position.

Thereafter, when the copy scanning operation is started and then is completed, the carriages 46 and 47 are caused to be stopped at the normal copy scan end position (steps S7 to S8). Next, the process operation is advanced to a step S9. At this step S9, the judgment result becomes "YES," and the process operation is advanced to a step S15. The judgment result at the step S15 becomes "YES." At this time, a signal is produced in the image input control unit 60, which is equivalent to a case that a completion instruction is issued from the user interface 64. Subsequently, the carriages 46 and 47 are returned to be stopped at the home position (step S10 to S11).

Next, the process operation is advanced to a step S12. Then, in response to the completion instruction signal produced from the image input control unit 60, the judgment result at the step S12 becomes "YES," so that the copying operation is ended. Next, in response to the completion instruction signal produced from the image input control unit 60, the judgment result at the step S12 becomes "YES," so that the copying operation is ended.

E. Advantages of Embodiment

Figure 11:
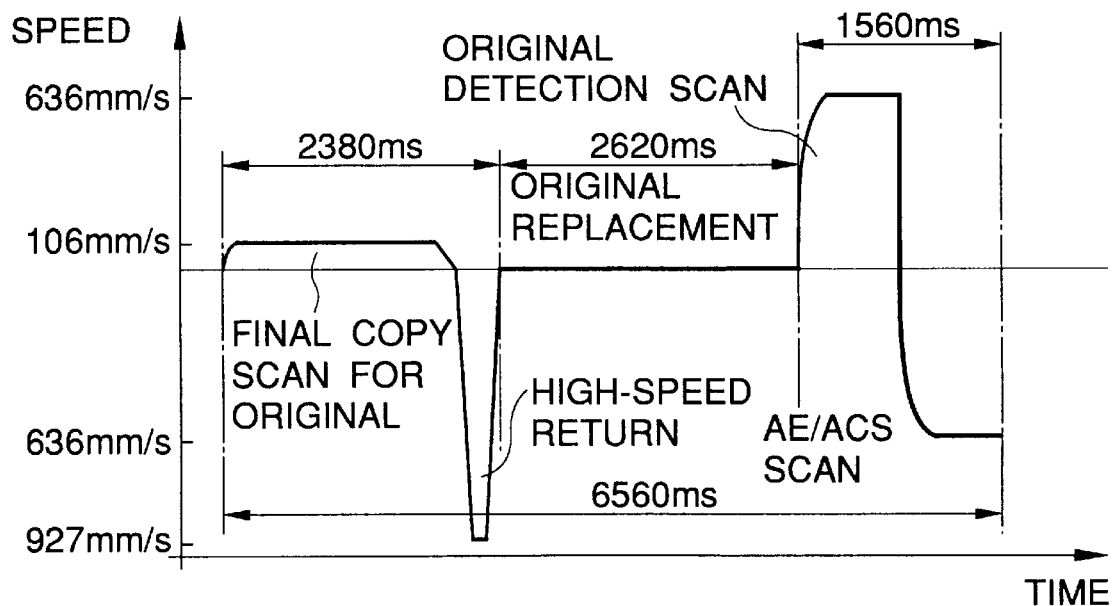
FIG. 11 is a timing chart showing a conventional original reading operation.
Figure 12:
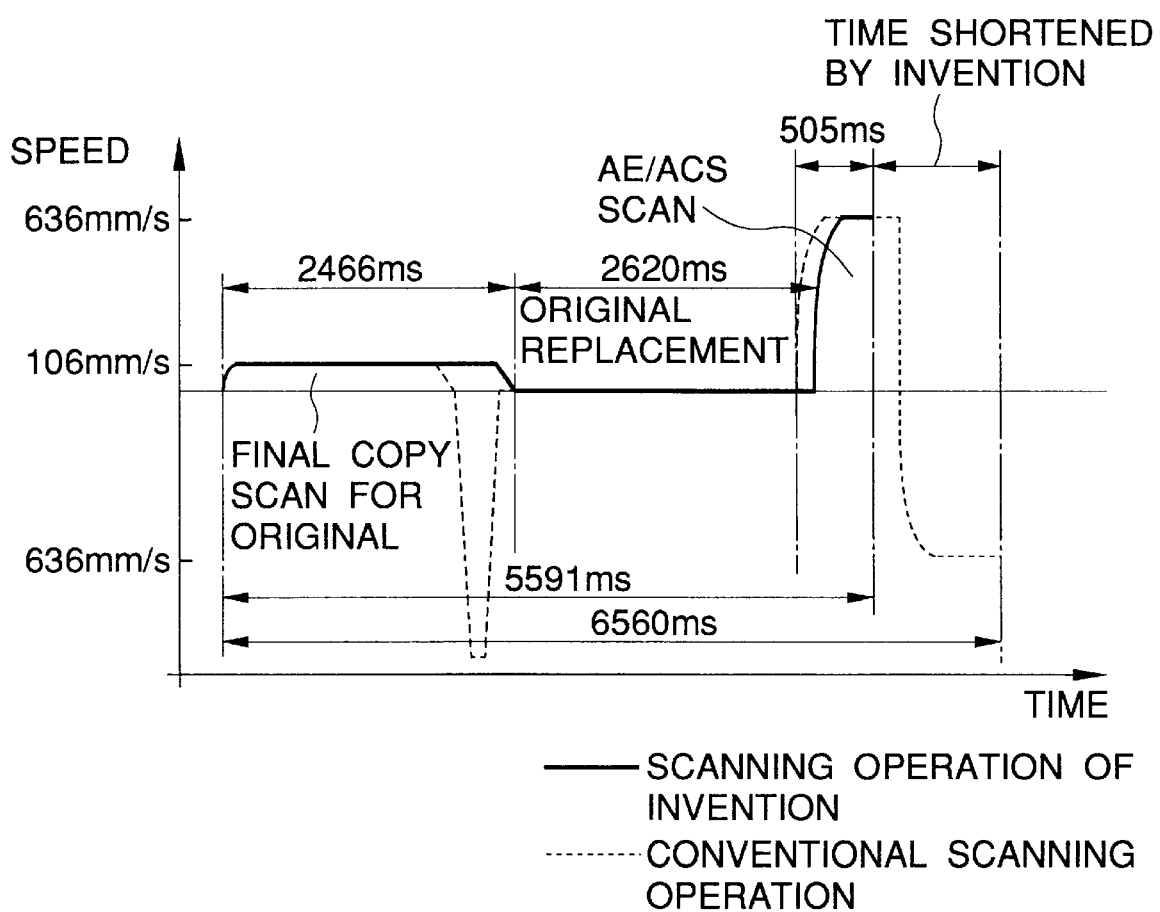
FIG. 12 is a timing chart showing an original reading operation according to the embodiment of the present invention.

FIG. 11 is a timing chart for representing the conventional original reading operations, and FIG. 12 is a timing chart for showing the original reading operations according to the embodiment. The abscissa of FIG. 11 and 12 denotes time, and the ordinate thereof shows a speed of the carriage 46. Both FIG. 11 and FIG. 12 illustrate the process operations defined from the final copy scanning operation to the preceding original D until the AE/ACS scanning operation to the succeeding original D.

Conventionally, after the final copy scanning operation to the original D, the carriages 46 and 47 are first returned at a high speed, and thereafter this original is replaced by the next original. Thereafter, the original detection scanning operation to the next original is performed while the carriages 46 and 47 are traveled along the going direction, and the AE/ACS scanning operation is carried out while the carriages 46 and 47 are returned.

To the contrary, according to this embodiment, after the final copy scanning operation to the original D, this original is immediately replaced by the next original. Thereafter, the AE/ACS scanning operation to the next original is carried out while the carriages are returned. Therefore, conventional operations that the carriages 46 and 47 are returned at high speeds and the original detection scanning operation is executed are eliminated. Thus, the operation time required before and after the original replacement can be shortened as much.

The times shown in FIG. 11 and FIG. 12 are shortened up to approximately 80%. In addition, the high-speed carriage returning operation which requires high power consumption can be omitted in the final copy scanning operation.

The times indicated in FIG. 11 and FIG. 12 correspond to the reading time for one sheet of a black-and-white original. This is because the final copy scanning operation implies that a black-and-white original is scanned only one time. In other words, in particular, when the black-and-white original is read, the reading time thereof could be shortened by approximately 80%. Also, in the case of the black-and-white original, after the copy scanning operation is carried out, there is no need to return the carriages 46 and 47. As a consequence, there is specifically an advantage that the power consuming amount can be reduced.

In other words, according to this embodiment, a useless time can be reduced during which after the image of the preceding original has been read, the carriages are returned along the second direction without performing the reading operation. Therefore, the reading time of the original can be shortened. As previously explained, even when the reading time of the originals per one sheet of original is slightly prolonged, a large delay is produced in outputting the images, resulting in lowering of the copying efficiency. Conversely, when the reading time of the original is slightly reduced, there are many cases that the waiting time for works in the image forming unit 3 may be considerably shortened. As a consequence, the copying efficiency may be largely increased in accordance with this embodiment. Also, in this case, after the copy scanning operation of the preceding original has been completed, the automatic document feeder 28 is driven to replace the originals, and then, the AE/ACS scanning operations of the subsequent originals are carried out. Accordingly, the temporarily required power consumption can be lowered.

F. Modifications

In the above-described embodiment, the document reading apparatus is used as one structural element of the electrostatic color copying machine. However, the present invention is not limited thereto, but, for instance, the document reading apparatus may be used as an independent apparatus. In this case, according to the present invention, since the temporarily required power consumption can be reduced, there is a great merit. That is, in such locations as offices and homes where power supply amounts are small, if this document reading apparatus is operated in conjunction with other electric appliances, then the peak power consumption of the document reading apparatus is coincident with the peak power consumption of the other electric appliances. Accordingly, there is a risk that no sufficient power may be supplied to these apparatuses. However, this risk can be avoided according to the present invention.

In the above-described embodiment, both the image density of the original and the color/black-and-white discrimination are read as the attributes of the original during the prescanning operation. In addition to this prescanning operation, or instead thereof, the text/image sections, the image editing marking, and the editing designation color may be read during the prescanning operation. Among them, the text/image sections are to discriminate a text portion of the original from an image portion such as a photographic image. This is read during the prescanning operation, and is combined with the image information obtained during the copy scanning operation. Then, the image process operation suitable for the text as to the text portion, and the image process operation suitable for the image as to the image portion are performed in the image processing calculation unit 61, so that the images with high qualities may be formed in the image forming unit 3.

Also the image editing marking corresponds to a portion on an original surrounded in ink by using a marker pen. This image editing marking is prescanned, so that various editing results are obtained as formed images in response to the editing works executed in the user interface 64.

The editing designation colors correspond to colors designated by the editor on the original. This color component data is produced during the prescanning operation, and the color portions may be converted into various modes.

It should be noted that when the attribute of the original to be read is increased, the prescanning operations with respect to the original D must be executed plural times. In this case, the prescan starting positions are selected in accordance with the times of the prescanning operations. If the prescanning operations are performed odd times, when the prescanning operation is commenced from the scanning end side, the carriages 46 and 47 are returned to the home position if the final prescanning operation is ended in a similar manner that the prescanning operation is carried out one time in the above-described embodiment. If the prescanning operations are performed even times, when the prescanning operation is commenced from the home position side, the carriages 46 and 47 are returned to the home position if the final prescanning operation is ended. As a consequence, the subsequent copy scanning operation is smoothly commenced.

In the above-described embodiment, the carriages 46 and 47 are held at the position where the reading operation of the original is accomplished, or at the position adjacent to the first-mentioned position, which is prepared for the AE/ACS scanning operation of the next original, e.g., reading of the attribute of the image. When the below-mentioned arrangement is additionally provided with this arrangement, it is possible to handle originals having different sizes in mixed form.

A size of an original $D_n$, inserted onto the platen glass 26 by the automatic document feeder 28 is sensed by the photosensor 36. This original size is compared with another size of an original $D_{n-1}$ which has been scanned just before the first-mentioned original. As to the comparison result, when the original $D_n$ and the original $D_{n-1}$ are the same sizes, or the size of the original $D_n$ is smaller than that of the original $D_{n-1}$ with respect to the main scanning direction of the original reading operation, the scanning operation to read the image attribute such as the AE/ACS scanning operation with respect to the original $D_n$ is commenced from the copy scan end position for the original $D_{n-1}$. On the other hand, when the original $D_n$ is larger than the original $D_{n-1}$, after the original $D_n$ has been inserted onto the platen glass, the carriages 46 and 47 are moved form the copy scan end position to the direction opposite to the home position. Then, the carriages 46 and 47 are moved up to the scan end position and are once stopped at this position. The scan end position corresponds to the size of the original $D_n$, sensed by the photosensor 36. Thereafter, while the carriages 46 and 47 are transported along the home position direction, the scanning operation to read the image attribute such as the AE/ACS scanning operation is performed. Both such an original size comparison and the movement/holding of the carriage position based on the comparison result are executed every time the original subsequent to the second original is inserted.

In the above-described embodiment, since the size of the original D is sensed by the photosensor 36 employed in the automatic document feeder 28, no size detection of this original D is entirely carried out by the reading unit 25. However, during the prescanning operation of the first original, the AE/ACS scanning operation is merely performed while the carriages 46 and 47 are traveled along either the going direction or the returning direction, and thus the carriages 46 and 47 are simply transported along either the going direction or the returning direction. As a consequence, for example, while the carriages 46 and 47 are moved along the going direction, the original detection scanning operation of the original D may be carried out over the substantially entire surface of the platen glass 26, whereas while the carriages 46 and 47 are moved along the returning direction, the AE/ACS scanning operation may be executed.

In this alternative case, the image input control unit 60 calculates the drive time of the automatic document feeder 28, the light emitting time of the lamp 40, and the rotation time of the stepper motor 48 based on the result of this original detection scanning operation. That is, data corresponding to the reading range of the original is set. It should also be noted that the judged information is further supplied to the image processing calculation unit 61 and the image formation control unit 62.

Alternatively, the size sensing operation by the photosensor 36 may be combined with the size detection scanning operation, so that the sensing precision may be further increased. Alternatively, the original detection scanning operation may be carried out only for a specific original length based on the sensed result of the photosensor 36.

There is a certain case that, for instance, the original D happens to be jammed and therefore, feeding of the original D is interrupted in the automatic document feeder 28. While feeding of the original D is interrupted, the preceding original D is inserted between the platen glass 26 and the transfer belt 35, and is advanced to the position separated from the registration position R. In such a case, feeding of this original may be restarted without replacing the original D. Under such a circumstance, the original may be read in such a manner that the carriages 46 and 47 are first moved to the scan end position, and then the original detection scanning operation is carried out from this scan end position while returning the carriages 46 and 47. As a result, the actually existing position of the original D may be judged.

As previously described in detail, according to the document reading apparatus and the document reading method of the present invention, the power consumption can be reduced as well as the entire document read time can be shortened.

What is claimed is:

1. A document reading apparatus, comprising:

original storing means for storing therein a plurality of originals;

mounting means on which one of the originals is to be mounted;

automatic original feeding means for feeding the originals from the original storing means one by one, and for temporarily stopping each of the originals on the mounting means;

reading means for reading an image of an original stopped on the mounting means;

first transporting means for transporting the reading means in a first direction to allow the reading means to read the image of the original stopped on the mounting means;

holding means for holding the reading means at a first position near an image reading end position after reading of the image of the original stopped on the mounting means by the reading means is completed;

second transporting means for transporting the reading means in a second direction opposite the first direction from the first position to allow the reading means to read an attribute of a next original after the next original is stopped on the mounting means by the original feeding means; and third transporting means for transporting the reading means in the first direction from the first position to a second position after the reading of the image of the original stopped on the mounting means is completed and before the reading means is held by the holding means.

2. The document reading apparatus as claimed in claim 1, wherein the attribute of the original is one of an image density, text and image sections, discrimination between a color image and a black-and-white image, an image edit marking, and a color designated for an edit operation.

3. The document reading apparatus as claimed in claim 1, further comprising:

size detecting means for detecting a size of an original while the original is fed toward the mounting means by the automatic original feeding means; and setting means for setting, on the fed original, a reading range to be read by the reading means based on the detected size of the fed original.

4. A document reading method, comprising the steps of:

causing reading means to read an attribute of an original stopped on a mounting means;

causing the reading means to read an image of the original stopped on the mounting means while transporting the reading means in a first direction;

holding the reading means at a first position near an image reading end position after reading of the image of the original is completed;

ejecting the original from the mounting means;

transporting the reading means in the first direction from the first position to a second position when a next original is larger than the original on the mounting means after the reading of the image of the original is completed and before the reading means is held by the holding means;

feeding the next original from an original storing means and stopping it on the mounting means; and causing the reading means to read an attribute of the next original stopped on the mounting means while transporting the reading means in a second direction opposite the first direction.

5. The document reading method as claimed in claim 4, wherein the attribute of the original is one of an image density, text and image sections, discrimination between a color image and a black-and-white image, an image edit marking, and a color designated for an edit operation.

6. The document reading method as claimed in claim 4, wherein the step of causing the reading means to read the attribute of the original comprises the substeps of detecting a size of the original as the attribute, and setting, on the original, a reading range to be read by the reading means based on the detected size of the original.

7. A document reading apparatus, comprising:

original storing means for storing a plurality of originals;

mounting means on which one of the originals is to be mounted;

automatic original feeding means for feeding the originals from the original storing means one by one, and for temporarily stopping each of the originals on the mounting means;

size detecting means for detecting a size of an original being fed by the automatic original feeding means;

reading means for reading an image of an original stopped on the mounting means;

first transporting means for transporting the reading means in a first direction to allow the reading means to read the image of the original stopped on the mounting means;

holding means for holding the reading means at a first position near an image reading end position after reading of the image of the original by the reading means is accomplished;

second transporting means for transporting the reading means in the first direction from the first position to a second position when a size of an original detected by the size detecting means is larger than a size of an original whose image has just been read; and third transporting means for transporting the reading means in a second direction opposite the first direction from the first or second position to allow the reading means to read an attribute of a next original after the next original is stopped on the mounting means by the automatic original feeding means.

8. An original reading method, comprising the steps of:

(a) causing automatic original feeding means to feed a first original from an original storing means for storing a plurality of originals to a mounting means;

(b) detecting a size of the first original;

(c) stopping the first original on the mounting means;

(d) causing reading means to read an attribute of the first original stopped on the mounting means;

(e) causing the reading means to read an image of the first original stopped on the mounting means while transporting the reading means in a first direction;

(f) holding the reading means at a first position near an image reading end position after reading of the image of the first original is completed;

(g) ejecting the first original from the mounting means;

(h) causing the automatic original feeding means to feed a second original from the original storing means to the mounting means;

(i) detecting a size of the second original;

(j) stopping the second original on the mounting means;

(k) transporting the reading means in the first direction from the first position to a second position when a size of the first original is smaller than that of the second original;

(l) causing the reading means to read an attribute of the second original stopped on the mounting means while transporting the reading means in a second direction opposite the first direction;

(m) causing the reading means to read an image of the second original stopped on the mounting means while transporting the reading means in the first direction;

(n) holding the reading means at the first position after reading of the image of the second original is completed;

(o) ejecting the second original from the mounting means;

(p) repeating steps (h) to (o) executed in connection with the second original as to subsequent originals.

9. The document reading method as claimed in claim 8, wherein the steps (a) and (h) comprise substeps of causing size detecting means that is provided in the automatic original feeding means to detect a size of an original, and setting, on the original, a reading range to be read by the reading means based on the detected size of the original.

* * * * *